US012713106B2

(12) United States Patent
Odayarkoil et al.

(10) Patent No.: US 12,713,106 B2
(45) Date of Patent: Aug. 18, 2026

(54) SYSTEMS AND METHODS FOR PAUSING A DIGITAL MEDIA STREAM IN RESPONSE TO DETERMINING THAT AN ASSOCIATED DISPLAY DEVICE IS TURNED OFF

(71) Applicant: NETFLIX, INC., Los Gatos, CA (US)

(72) Inventors: Baskar Odayarkoil, San Jose, CA (US); Akshay Garg, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/160,473

(22) Filed: Jan. 27, 2023

(65) Prior Publication Data

US 2024/0259650 A1 Aug. 1, 2024

(51) Int. Cl.

| | |
|---|---|
| ***H04N 7/173*** | (2011.01) |
| ***H04N 21/442*** | (2011.01) |
| ***H04N 21/472*** | (2011.01) |
| ***H04N 21/6543*** | (2011.01) |
| ***H04N 21/845*** | (2011.01) |

(52) U.S. Cl.

CPC ... *H04N 21/6543* (2013.01); *H04N 21/44204* (2013.01); *H04N 21/47217* (2013.01); *H04N 21/8455* (2013.01)

(58) Field of Classification Search

CPC ......... H04N 21/6543; H04N 21/44204; H04N 21/47217; H04N 21/8455; H04N 21/4333; H04N 21/43615; H04N 21/43635; H04N 21/4424; H04N 21/44227

See application file for complete search history.

(56) References Cited

U.S. PATENT DOCUMENTS

| | | | | |
|---|---|---|---|---|
| 8,516,087 | B2 * | 8/2013 | Wilson | H04N 21/4131 709/224 |
| 9,043,459 | B2 * | 5/2015 | Parker | H04N 21/41407 715/716 |
| 9,084,003 | B1 * | 7/2015 | Sanio | H04N 21/4222 |
| 10,003,849 | B1 * | 6/2018 | Killick | H04N 21/8547 |
| 11,310,614 | B2 * | 4/2022 | Proctor, Jr. | H04N 21/43615 |
| 2009/0249410 | A1 * | 10/2009 | Maruyama | H04N 21/47202 725/88 |
| 2011/0069940 | A1 * | 3/2011 | Shimy | H04N 21/4532 386/296 |

(Continued)

OTHER PUBLICATIONS

International Search Report and Written Opinion for International Application No. PCT/US2023/081975, dated Apr. 18, 2024; 13 pages.

*Primary Examiner* — Annan Q Shang
(74) *Attorney, Agent, or Firm* — Artegis Law Group, LLP

(57) ABSTRACT

The disclosed computer-implemented methods and systems include pausing a digital content stream being provided to a display device in response to determining that the display device is powered off. For example, rather than utilizing signals related to the power status of the display device, the disclosed methods and systems utilize signals related to display protocols and interfaces utilized by the display device to determine its power status. In response to determining that a display device is powered off, the disclosed methods and systems can pause the digital content stream being provided to the display device. Various other methods, systems, and computer-readable media are also disclosed.

19 Claims, 4 Drawing Sheets

(56) References Cited

U.S. PATENT DOCUMENTS

| | | | | |
|---|---|---|---|---|
| 2012/0295973 | A1* | 11/2012 | Scott | A61K 31/70<br>514/548 |
| 2013/0184064 | A1* | 7/2013 | Manning | G07F 17/32<br>463/32 |
| 2013/0339998 | A1* | 12/2013 | Arme | H04N 21/4722<br>725/32 |
| 2014/0006951 | A1* | 1/2014 | Hunter | H04N 21/44224<br>715/719 |
| 2015/0269068 | A1* | 9/2015 | Yun | G06F 12/023<br>711/170 |
| 2016/0066064 | A1* | 3/2016 | Chesluk | H04N 21/4756<br>725/93 |
| 2016/0077710 | A1 | 3/2016 | Lewis | |
| 2017/0134831 | A1* | 5/2017 | Talukder | H04N 21/242 |
| 2017/0208363 | A1 | 7/2017 | Glazier | |
| 2018/0035155 | A1* | 2/2018 | Garner | H04N 21/41265 |
| 2019/0050600 | A1* | 2/2019 | Sahoo | G06F 21/6281 |
| 2020/0099995 | A1 | 3/2020 | Wittke | |
| 2020/0275225 | A1* | 8/2020 | Proctor, Jr. | H04N 21/8106 |
| 2020/0304876 | A1* | 9/2020 | Cielak | H04N 21/4823 |
| 2024/0104861 | A1* | 3/2024 | DeDonato | G06F 3/012 |

* cited by examiner

SYSTEMS AND METHODS FOR PAUSING A DIGITAL MEDIA STREAM IN RESPONSE TO DETERMINING THAT AN ASSOCIATED DISPLAY DEVICE IS TURNED OFF

BACKGROUND

Streaming media content is an increasingly popular form of entertainment. For instance, example digital content systems can stream selected digital media items (e.g., TV shows, movies, video games) to subscribers' display devices for instant playback. In this way, digital content system subscribers can watch digital content and/or play video games on their televisions, smart phones, tablets, laptops, etc.

In some scenarios, the example digital content systems may stream digital media content to a subscriber's TV via a set-top digital content receiver. For example, a digital content receiver may include a digital content system application that receives a digital content stream from an example digital content system. The digital content receiver may then broadcast the digital content stream for playback on an associated TV.

This arrangement can give rise to various issues. For example, in most implementations, the digital content receiver associated with a display device (e.g., a TV) generally has no way of detecting when the display device is turned off. As such, the associated example digital content system will continue to generate and provide the digital content stream to the digital content receiver—even when the associated TV is turned off and no one is watching.

By providing this unwatched digital content stream, the example digital content system generates computational waste in addition to other technological inaccuracies. For example, by providing the unwatched digital content stream, the example digital content system creates playback issues that—in turn—generate computational waste. To illustrate, an example digital content system subscriber may expect the playback position of a TV show to remain unchanged after they turn their TV off. Because the example digital content system receives no signal indicating that the TV is turned off, however, the example digital content system may continue streaming the TV show to the subscriber's TV. Thus, when the subscriber returns to watch more of the TV show, the playback position of the TV show will have advanced, and the subscriber will be forced to manually search for the expected playback position. This manual search will cause the example digital content system to utilize additional processing resources and network bandwidth resources that would not have been otherwise utilized.

Moreover, the example digital content system may waste additional computational resources across the network that connects the example digital content system with the digital content receiver. For example, the example digital content system may consume bandwidth within the network (e.g., the Internet) at various points. As such, by providing an unwatched digital content stream across the network, the example digital content system can create an unnecessary bandwidth chokepoint. This waste may lead to additional computational issues as other network participants experience slowdowns due to lack of network bandwidth.

Additionally, in providing an unwatched digital content stream, the example digital content system may generate various inaccuracies. For instance, the example digital content system may generate metrics associated with subscriber playback that indicate which TV shows are currently popular, how much time subscribers spend watching different types of digital content, whether subscribers pause playback of various digital content items, and so forth. The example digital content system may use these metrics to acquire additional digital content, optimize playback of digital content, sell advertisement space, etc. The example digital content system, however, may generate inaccurate metrics in response to providing an unwatched digital content stream. More specifically, the example digital content system may generate inaccurate metrics because many of these metrics are based on subscribers actually viewing the digital content and it can be difficult to detect whether a subscriber is actually watching the provided digital content stream.

SUMMARY

As will be described in greater detail below, the present disclosure describes embodiments in which a digital content stream is paused in response to determining that an associated display device (e.g., a TV) is or has been turned off.

In one example, a computer-implemented method for determining that a display device has been turned off and pausing a corresponding digital content stream includes detecting a status change corresponding to a display device associated with a content receiver for a digital content system, determining, based on the detected status change, that the display device is turned off, and pausing a digital content stream to the content receiver based on the determination.

In some examples, the method for determining that a display device has been turned off and pausing a corresponding digital content stream can further include detecting an additional status change corresponding to the display device. The method can also further include determining, based on the detected additional status change, that the display device is turned on. In some examples, the method for determining that a display device has been turned off and pausing a corresponding digital content stream can further include providing an option to restart the digital content stream based on determining that the display device is turned on.

In one or more examples, detecting the status change corresponding to the display device comprises at least one of: detecting a change in HDMI status associated with the display device, detecting a change in HDCP version associated with the display device, or detecting a change in CEC status associated with the display device. Additionally, the method for determining that a display device has been turned off and pausing a corresponding digital content stream can further include detecting a user-selected option to restart the digital content stream and restarting the digital content stream to the content receiver. The method for determining that a display device has been turned off and pausing a corresponding digital content stream can further include generating machine learning model training data based on restarting the digital content stream to the content receiver and applying a determination machine learning model to the generated machine learning model training data. The method for determining that a display device has been turned off and pausing a corresponding digital content stream can further include further, in response to pausing the digital content stream to the digital content receiver, generating a bookmark indicating a current playback position of the paused digital content stream, and transmitting the generated bookmark to one or more additional systems.

Some examples described herein include a system with at least one physical processor and physical memory including computer-executable instructions that, when executed by the at least one physical processor, cause the at least one physical process to perform acts. In at least one example, the computer-executable instructions, when executed by the at least one physical processor, cause the at least one physical process to perform acts including: detecting a status change corresponding to a display device associated with a content receiver for a digital content system, determining, based on the detected status change, that the display device is turned off, and pausing a digital content stream to the content receiver based on the determination.

In some examples, the above-described method is encoded as computer-readable instructions on a computer-readable medium. In one example, the computer-readable instructions, when executed by at least one processor of a computing device, cause the computing device to: detect a status change corresponding to a display device associated with a content receiver for a digital content system, determine, based on the detected status change, that the display device is turned off, and pause a digital content stream to the content receiver based on the determination.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
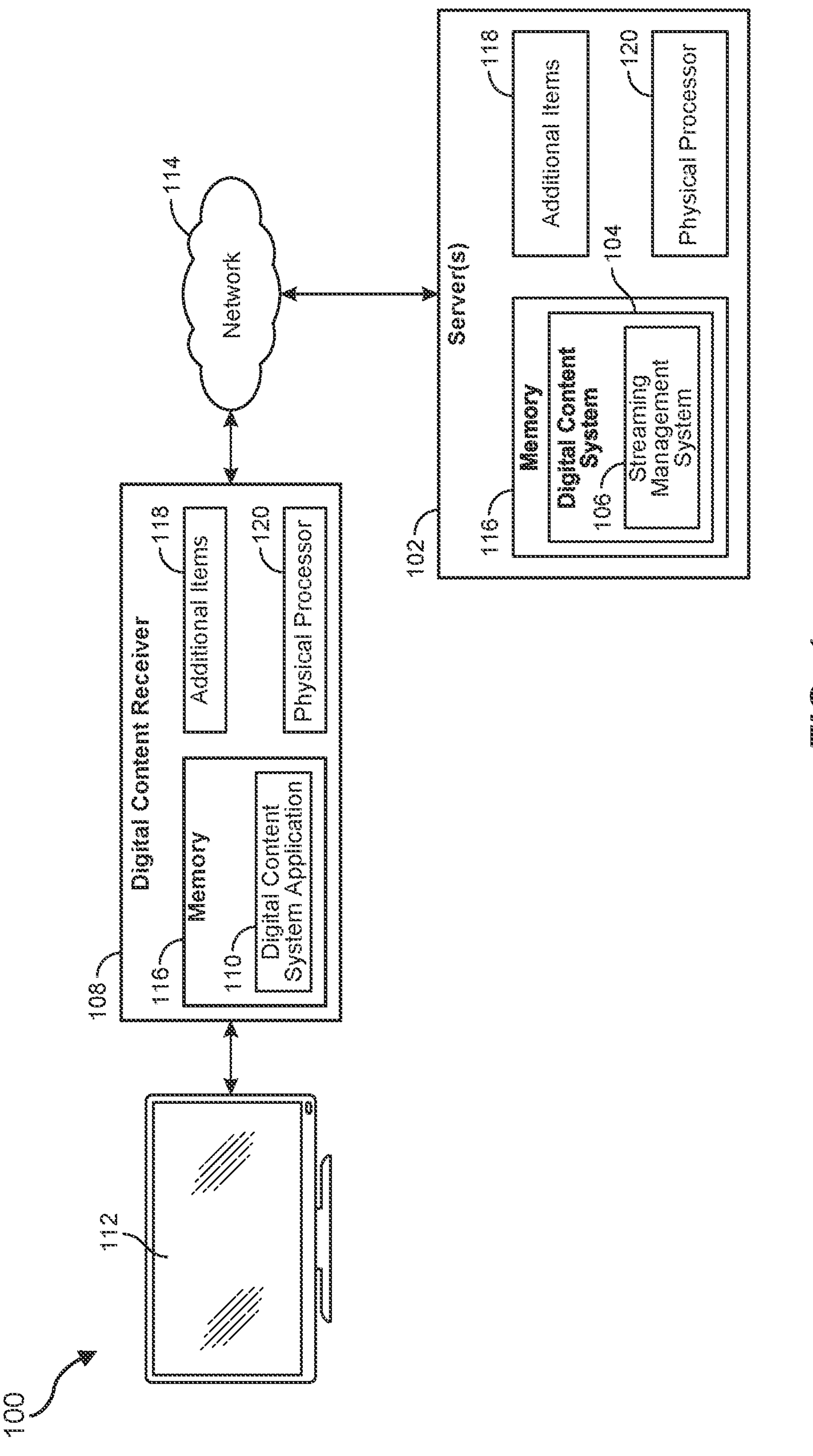
FIG. 1 is an overview diagram of a network environment in which a streaming management system operates in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, streaming unwatched digital content can give rise to waste and other inaccuracies within a computing system and network. For example, by streaming digital content to a display device that is or has been turned off, example digital content systems may waste limited network bandwidth as well as other computing resources that are spent as subscribers manually search for the correct playback points within their movies and TV shows. Moreover, because example digital content systems have no way of detecting whether streamed digital content is actually being watched by subscribers, the metrics they generate related to the digital content may likely be inaccurate.

To remedy these problems, the present disclosure describes implementations that can infer whether a display device is or has been turned off based on signals that are not directly related to the display device's current power status. For example, these implementations may detect signals related to display standards used by the display device. These implementations can further infer whether the display device is turned off based on these detected signals. In response to predicting that a display device receiving a digital content stream is turned off, the implementations discussed herein can pause the digital content stream until determining that the display device has been turned back on based on the same signals.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
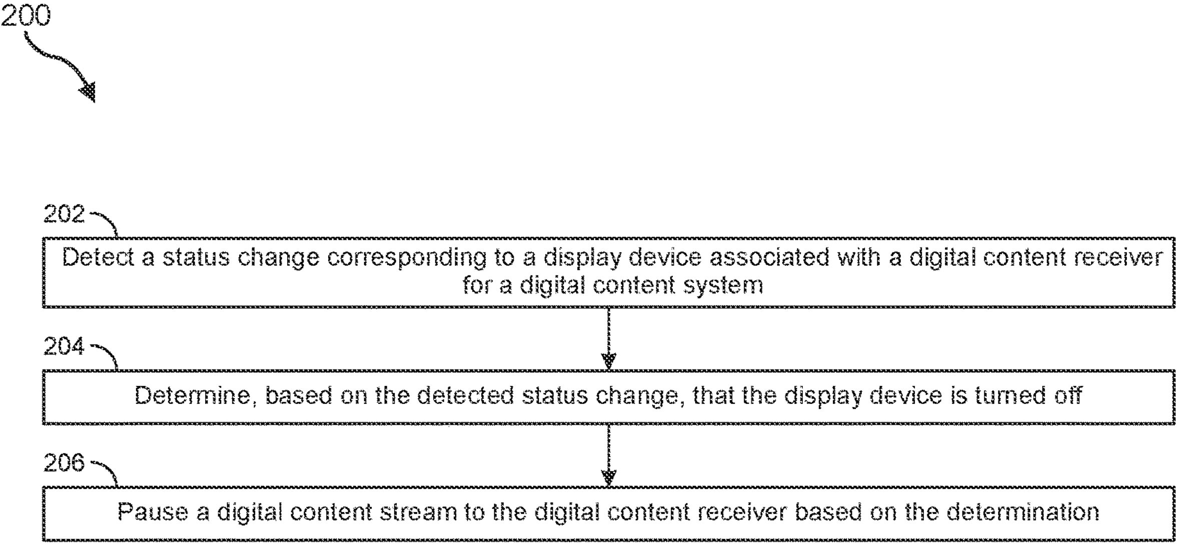
FIG. 2 is a flow diagram of an exemplary computer-implemented method for pausing a digital content stream in response to determining that an associated display device is turned off in accordance with one or more implementations.
Figure 3:
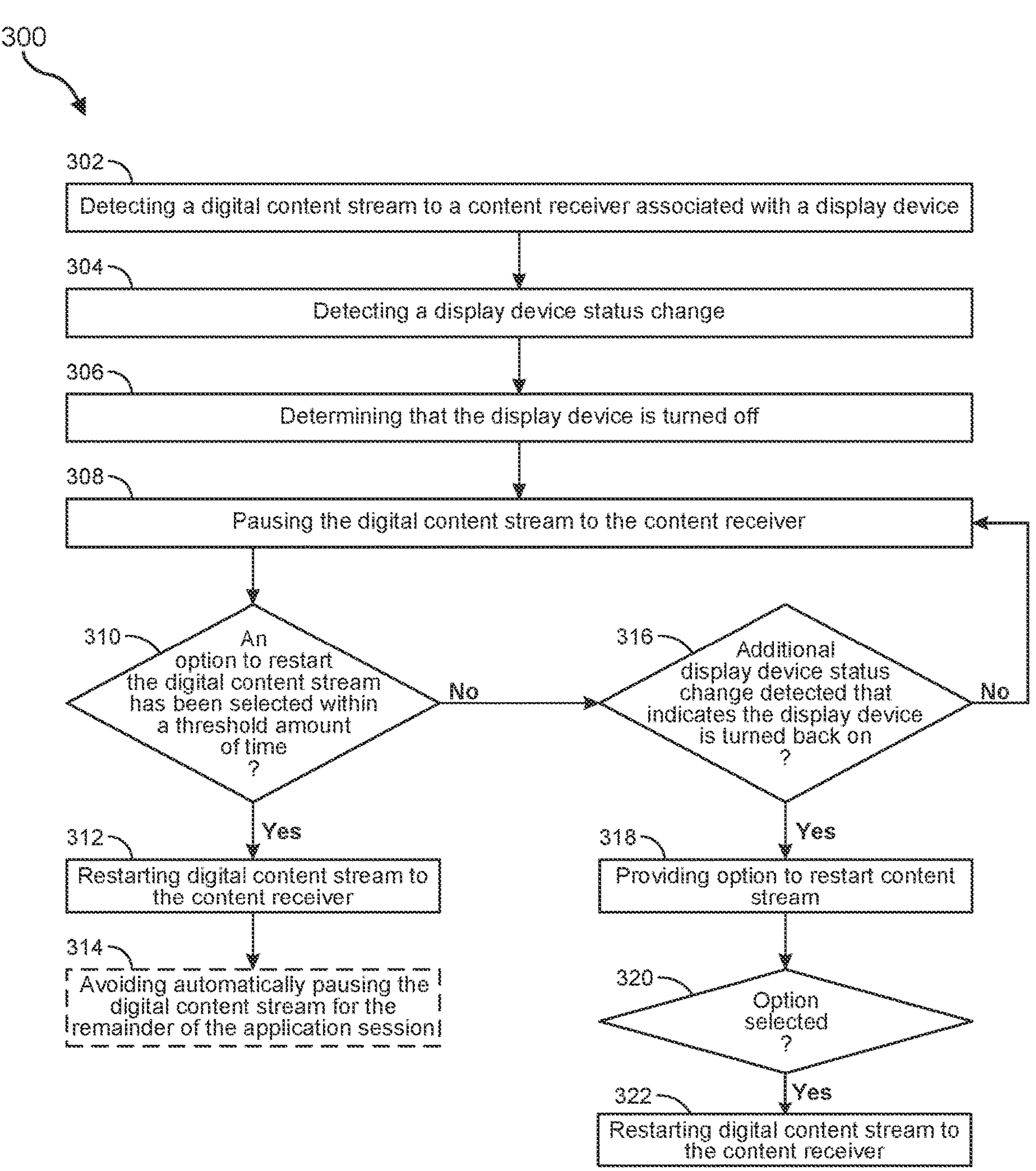
FIG. 3 is a sequence diagram illustrating how the streaming management system pauses and restarts a digital content stream based on inferences associated with a power state of an associated display device in accordance with one or more implementations.
Figure 4:
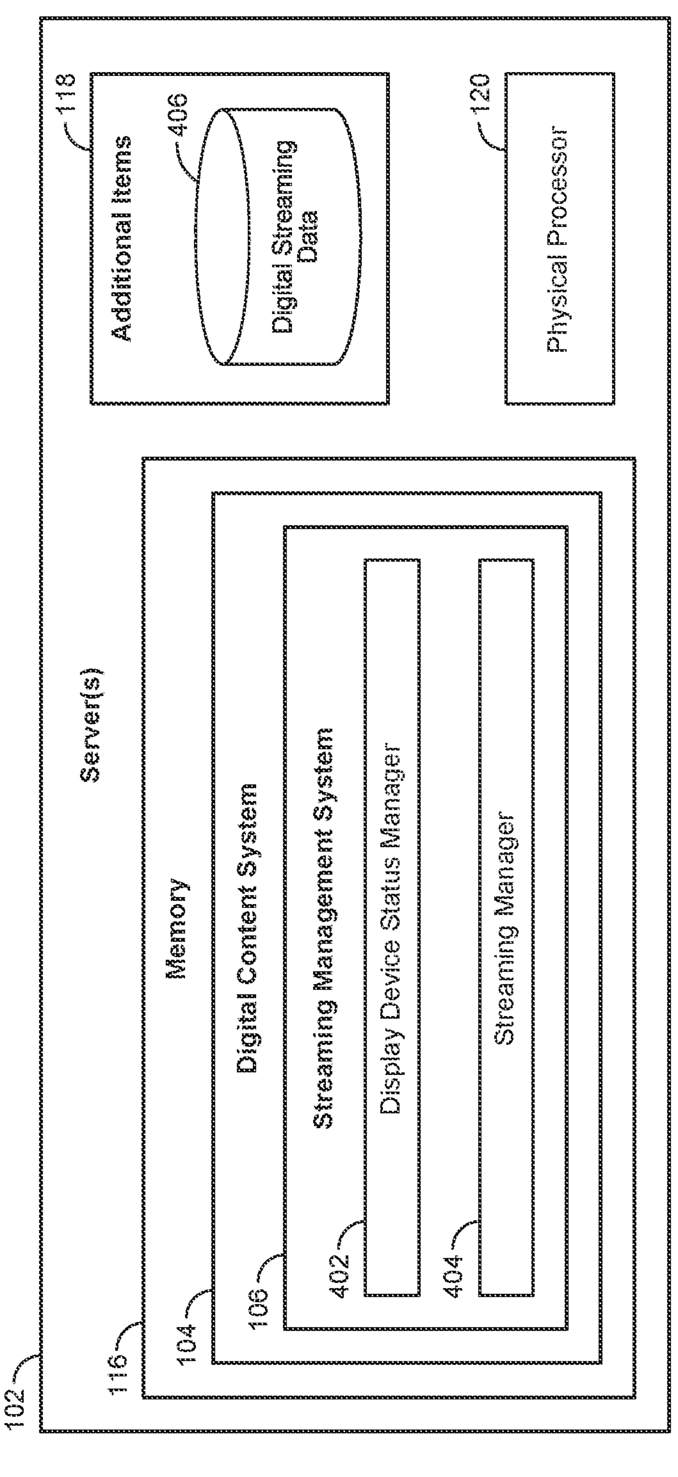
FIG. 4 is a detailed diagram of the streaming management system in accordance with one or more implementations.

The following will provide, with reference to FIGS. 1-4, detailed descriptions of a streaming management system that can predict whether a display device has been turned off and pause a digital content stream associated with that display device based on the prediction. For example, an exemplary network environment is illustrated in FIG. 1 to illustrate how the streaming management system interacts with an arrangement of devices determining a display device's power status. FIG. 2 illustrates a method flow of the streaming management system determining whether a display device is turned on and then pausing an associated digital content stream based on the determination. FIG. 3 includes a detailed sequence diagram of additional acts performed by the streaming management system in pausing and restarting a digital content stream associated with a particular display device, while additional detail associated with the streaming management system is illustrated in FIG. 4.

As just mentioned, FIG. 1 illustrates an exemplary networking environment 100 implementing aspects of the present disclosure. For example, the networking environment 100 can include server(s) 102, a digital content receiver 108, a display device 112, and a network 114. As further shown, the server(s) 102 and the digital content receiver 108 can include a memory 116, additional items 118, and a physical processor 120.

In at least one implementation, a streaming management system 106 may be implemented as part of a digital content system 104 within the memory 116 of the server(s) 102. In some implementations, the digital content receiver 108 may also include a digital content system application 110 installed on the memory 116 thereon. As shown in FIG. 1, the digital content receiver 108 and the server(s) 102 can communicate via the network 114 to transmit and receive digital content data.

As illustrated in FIG. 1, the display device 112 can include any type of device suitable for displaying digital content. For example, the display device 112 can include, but is not limited to, a television (TV), a monitor, a smart phone, a smart wearable, a laptop computer, a desktop computer, a tablet computer, a video conferencing device, and/or a virtual reality device. In at least one implementation, the display device 112 is a device suitable for displaying digital content streamed to the associated digital content receiver 108. For example, the digital content receiver 108 can include a "set top" unit that is connected to the display device 112 via one or more display protocols and/or interfaces. In one or more implementations, the digital content receiver 108 may further include a network connection (e.g., an Internet connection) by which the digital content system 104 streams digital content to the digital content receiver 108. Moreover, in some implementations, the environment 100 can further include an intermediate device. For example, the digital content receiver 108 can be connected to a sound bar or an audio video receiver, which is then connected to the display device 112.

In one or more implementations, as shown in FIG. 1, the digital content receiver 108 can further include the digital content system application 110. For example, the digital content system 104 may stream digital content to the digital content receiver 108 via the digital content system application 110. The digital content receiver 108 can further broadcast the digital content stream to the display device 112. As such, the digital content system application 110 may include communication protocols that enable receipt of digital content items and/or digital content streams from the digital content system 104. In at least one implementation, the digital content system application 110 may further include communication protocols that enable the digital content system application 110 to send data back to the digital content system 104.

In one or more implementations, the digital content system 104 may be installed on the server(s) 102. For example, the digital content system 104 can provide subscriber-based streaming services where the digital content system 104 streams digital content (e.g., movies, TV content, video games) to subscribers for playback on the subscribers' display devices.

As further shown in FIG. 1, the digital content system 104 can include the streaming management system 106. In one or more implementations, the streaming management system 106 can receive signals from the digital content receiver 108 related to various display protocols utilized by the display device 112. The streaming management system 106 can further determine whether the display device 112 has experienced a status change and whether that status change indicates the display device 112 has been turned off. In response to determining or predicting that the display device 112 is turned off, the streaming management system 106 can also cause the digital content system 104 to pause a digital content stream being provided to the digital content receiver 108.

As mentioned above, the digital content receiver 108 and the server(s) 102 may be communicatively coupled through the network 114. The network 114 may represent any type or form of communication network, such as the Internet, and may include one or more physical connections, such as a LAN, and/or wireless connections, such as a WAN.

Although FIG. 1 illustrates components of the networking environment 100 in one arrangement, other arrangements are possible. For example, in one implementation, the streaming management system 106 may operate from the digital content receiver 108, or the display device 112. In some implementations, a portion of the functionality of the streaming management system 106 may be performed on the digital content receiver 108 or the display device 112. Similarly, in some implementations, the features and functionality of the digital content system 104 may be performed across multiple servers.

In one or more implementations, the methods and steps performed by the streaming management system 106 reference multiple terms. For example, the term "status change" can refer to a current status of a device within the exemplary networking environment 100 that has changed since the status was previously determined. The changed status may be associated with any signal originating from the device (e.g., the display device 112). For example, the signal may be associated with a display protocol or interface utilized by the device.

As used herein, a "digital content stream" can refer to a continuous flow of data. For example, the digital content system 104 can generate and emit a digital content stream to a subscriber's device. The digital content stream can include display data, audio data, and other data needed for digital media playback on the subscriber's device. In some implementations, the digital content stream may be two-way—meaning that the digital content system 104 can receive data back from a subscriber's device via the digital content stream.

As mentioned above, FIG. 2 is a flow diagram of an exemplary computer-implemented method 200 for pausing a digital content stream in response to detecting that a display device is turned off. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the streaming management system 106 can detect a status change corresponding to a display device (e.g., the display device 112) associated with a digital content receiver (e.g., the digital content receiver 108) for a digital content system (e.g., the digital content system 104). For example, the streaming management system 106 can detect one or more signals associated with a display protocol utilized by the display device 112 and provided by the digital content receiver 108. The streaming management system 106 can then determine that a status of the display device 112 has changed based on the one or more signals.

Additionally, at step 204 the streaming management system 106 can determine, based on the detected status change, that the display device is turned off. For example, the streaming management system 106 can analyze the status change to detect, for example, that the high-definition multimedia interface (HDMI) status associated with the display device 112 has changed from active to inactive. In response to this, the streaming management system 106 can determine that the display device 112 has been turned off.

Furthermore, at step 206 the streaming management system 106 can pause a digital content stream to the digital content receiver based on the determination. For example, if the digital content system 104 is streaming digital content to the display device 112, the streaming management system 106 can pause that stream in response to determining that the display device 112 is turned off—even though the streaming management system 106 has received no signals directly related to the power status of the display device 112. Instead, as mentioned above, the streaming management system 106 determines that the display device 112 is turned off based on signals related to display protocols and/or interfaces utilized by the display device 112.

In one or more implementations, the streaming management system 106 can perform specific acts in a sequence while determining whether or not to pause a digital content stream. FIG. 3 illustrates a sequence 300 of acts performed by the streaming management system 106 starting with an act 302 of detecting a digital content stream to a content receiver (e.g., the digital content receiver 108) associated with a display device (e.g., the display device 112). For example, the streaming management system 106 can monitor or receive notifications regarding digital content streams emanating from the digital content system 104.

In response to detecting a digital content stream that is sent to the content receiver, the streaming management system 106 can perform an act 304 of detecting a display device status change. For example, the streaming management system 106 can periodically receive signals related to a display protocol or interface being utilized by the display device 112. In one or more implementations, the streaming management system 106 can receive these signals from the digital content system application 110 on the digital content receiver 108.

In more detail, the streaming management system 106 (e.g., via the digital content receiver 108) can receive signals related to an HDMI status associated with the display device 112, a high-bandwidth digital content protection (HDCP) version associated with the display device 112, and/or a consumer electronics control (CEC) version associated with the display device 112. For example, the streaming management system 106 can receive signals indicating whether the HDMI status is active or inactive, whether the HDCP version is zero or not, and/or whether the CEC status is active or inactive. In at least one implementation, the streaming management system 106 can detect that the display device status has changed in response to: detecting that the HDMI status has gone from active to inactive, detecting that the HDCP version has gone from 2.1 to 0, and/or that the CEC status has gone from active to inactive.

In response to detecting the status change, the streaming management system 106 can perform an act 306 of determining that the display device has been turned off. For example, the streaming management system 106 can utilize tables, databases, and/or machine learning techniques to predict whether or not the detected status change indicates that the display device has been turned off. To illustrate, the streaming management system 106 can utilize a lookup table to determine that a change in HDMI status from active to inactive indicates that the display device has been turned off.

In one or more implementations, following this determination, the streaming management system 106 can perform an act 308 of pausing the digital content stream to the content receiver. For example, in one implementation, the streaming management system 106 can pass an instruction to the digital content system 104 that causes the digital content stream to pause. In another example, the streaming management system 106 can pass an instruction to the digital content system 104 that causes the digital content system 104 to end the digital content stream after recording the current playback position of the digital content stream.

While the digital content stream is paused (or ended), the streaming management system 106 can first perform an act 310 of determining whether an option to restart the digital content stream has been selected by a subscriber within a threshold amount of time. In one or more implementations, detecting a user selection of an option to restart the digital content stream within a threshold amount of time from the pause can indicate that the digital content stream was incorrectly paused and that the display device 112 is still turned on (e.g., a false positive). For example, the streaming management system 106 can detect the user selecting the option to restart the digital content stream within a threshold amount of time such as 2 seconds, 5 seconds, 30 seconds etc.

In response to detecting the selection of the option to restart the digital content stream within the threshold amount of time (e.g., "Yes" in the act 310), the streaming management system 106 can perform an act 312 of restarting the digital content stream to the content receiver. For example, the streaming management system 106 can restart the digital content stream at the same playback position where the pause occurred. Furthermore, in some implementations and following restarting the digital content stream, the streaming management system 106 can further perform an act 314 of avoiding automatically pausing the digital content stream for the remainder of the application session. For example, the streaming management system 106 can ignore any additional signals associated with the display device 112 until the next time the digital content system application 110 is initialized on the digital content receiver 108.

In response to determining that the user has not selected the option to restart the digital content stream within the threshold amount of time (e.g., "No" in the act 310), the streaming management system 106 can perform an act 316 of detecting an additional display device status change that indicates the display device is turned back on. For example, while the digital content stream is paused, the streaming management system 106 can periodically determine whether a signal has been received from the digital content receiver 108 in connection with the display device 112 that is different from the signal previously received that indicated that the display device 112 is turned off.

To illustrate, the additional display device status change can be the HDMI status changing from inactive to active, the HDCP version changing from zero to something other than zero, and/or the CEC status changing from inactive to active. In response to determining that there has not been an additional display device status change (e.g., "No" in the act 316), the streaming management system 106 can return to the act 308 by keeping the digital content stream paused. In one or more implementations, the streaming management system 106 can iteratively repeat the act 316 of determining whether an additional display device status is detected indicating that the display device has been turned back on. In at least one implementation, the streaming management system 106 can skip the act 310 in these iterations once the threshold amount of time has passed. In other implementations, the streaming management system 106 can perform the act 310 in each iteration.

In response to determining that there has been an additional display device status change (e.g., "Yes" in the act 316), the streaming management system 106 can next perform an act 318 of providing an option to restart the digital content stream. For example, the streaming management system 106 can generate and provide a display overlay that includes a selectable "play" or "resume" option (e.g., a button). The streaming management system 106 can perform an act 320 of determining whether the user selects the generated option. In response to determining that the option has been selected (e.g., "Yes" in the act 320), the streaming management system can perform an act 322 of restarting the digital content stream (e.g., as with the act 312 discussed above). For example, as mentioned above, the streaming management system 106 can cause the digital content system 104 to restart or un-pause the digital content stream to the digital content receiver 108.

As mentioned above, the streaming management system 106 performs various functions in connection with pausing a digital content stream in response to determining that a display device is turned off. FIG. 4 is a block diagram 400 of the streaming management system 106 operating within the digital content system 104 on the memory 116 of the server(s) 102 while performing these functions. As such, FIG. 4 provides additional detail with regard to these functions. For example, as shown in FIG. 4, the streaming management system 106 can include a display device status manager 402 and a streaming manager 404. Additionally, the additional items 118 can include digital streaming data 406.

In certain implementations, the streaming management system 106 may represent one or more software applications or programs that, when executed by a computing device, may cause the computing device to perform one or more tasks. For example, and as will be described in greater detail below, one or more of the display device status manager 402 or the streaming manager 404 may represent software stored and configured to run on one or more computing devices, such as the server(s) 102. One or more of the display device status manager 402 and the streaming manager 404 of the streaming management system 106 shown in FIG. 4 may also represent all or portions of one or more special purpose computers to perform one or more tasks.

As mentioned above, and as shown in FIG. 4, the streaming management system 106 can include the display device status manager 402. In one or more implementations, the display device status manager 402 can receive various signals associated with the display device 112. For example, the display device status manager 402 can receive signals associated with display protocols and/or interfaces utilized by the display device 112 to display digital content.

Additionally, as mentioned above, the display device status manager 402 can determine whether a particular status has changed based on the received signals. For example, the display device status manager 402 can determine whether an HDMI status associated with the display device 112 has changed from active to inactive, whether an HDCP status associated with the display device 112 has changed from an initial version (e.g., a version 1.x or a version 2.x) to zero, and/or whether a CEC status associated with the display device 112 has changed from active to inactive. In at least one implementation, the display device status manager 402 can determine that any of these statuses have changed when a received signal is different from another previously received signal.

In one or more implementations, the display device status manager 402 can predict a power status of the display device 112 based on a determined status change. For example, the display device status manager 402 can determine whether the display device 112 is turned off when a particular status changes from active to inactive, or when a version status changes to zero. In at least one implementation, the display device status manager 402 can predict the power status of the display device 112 utilizing tables, decision trees, or other algorithms. The display device status manager 402 may repeat this determination/prediction at regular intervals.

In at least one implementation, the display device status manager 402 can predict the power status of the display device 112 utilizing a machine learning model. For example, the display device status manager 402 can generate a determination machine learning model. The display device status manager 402 can further train the determination machine learning model with training data including ground truths associated with correspondences between different types of status changes and display device power status. In one or more implementations, the display device status manager 402 can further train the determination machine learning model based on training data that includes observed usage patterns of subscribers and/or on observed display device brand functionality. In one or more implementations, the display device status manager 402 can train the determination machine learning model by applying the determination machine learning model to the training data, comparing the predictions generated by the determination machine learning model to the ground truths, and modifying (e.g., back-propagating) the determination machine learning model based on the comparisons. The display device status manager 402 can repeat this training cycle until the generated predictions converge.

Additionally, the display device status manager 402 can detect a user-selected option to restart the digital content stream. For example, in some implementations and shortly following the streaming management system 106 automatically pausing the digital content stream, a subscriber may select an option to restart the digital content stream (e.g., the subscriber may click the play button) within a threshold amount of time (e.g., 2 seconds, 5 seconds). In some implementations, the display device status manager 402 can infer from this that the determination that the display device had been turned off was a false positive. Thus, in response to detecting the user selection of the option to restart the digital content stream, the display device status manager 402 can cause the digital content stream to restart and can log the false positive.

In more detail, the display device status manager 402 can log data associated with the user-selected option to restart. For example, the display device status manager 402 can log the type of display device, the type of digital content receiver, the date and time, the amount of time in between automatically pausing the digital content stream and the user's selection of the option to restart, and additional subscriber use-data. In some implementations, the display device status manager 402 can utilize this logged data to update the methods by which the display device status manager 402 predicts whether a display device is turned off. For example, the display device status manager 402 can utilize the logged data to update tables, decision trees, etc. utilized to determine whether a display device is turned off. The display device status manager 402 can further generate training data for the determination machine learning model based on the logged data. In that implementation, the display device status manager 402 can apply the determination machine learning model to the generated machine learning training data to increase the accuracy of the determination machine learning model.

In at least one implementation, the display device status manager 402 can further determine whether an exception has occurred. For example, the display device status manager 402 may reverse a determination that a display device is turned off in response to a particular scenario. To illustrate, due to a subscriber watching trailers on a homepage of the digital content system 104 in standard dynamic range (SDR) and then switching to watching a movie or show in high dynamic range (HDR), the display device status manager 402 may determine that the associated display device has been turned off. Following this determination, however, the display device status manager 402 may further detect the resynchronization from SDR to HDR within a threshold amount of time. In response to detecting this resynchronization, the display device status manager 402 may reverse the determination that the display device is turned off. In this way, the display device status manager 402 can guard against incorrectly pausing the digital content stream in certain scenarios.

Additionally, the display device status manager 402 can track the display device's power state even when the digital content system 104 is not streaming digital content to the digital content receiver 108. For example, the digital content system application 110 may continue to receive signals from the display device 112 even when it is not broadcasting a digital content stream to the display device 112. For example, the subscriber associated with the display device 112 may be scrolling through menus of the digital content system 104, watching previews and trailers, and so forth. As such, the display device status manager 402 can continue determining whether or not the display device 112 is turned on. If there is no digital content stream being sent to the digital content receiver 108 and/or display device 112, the display device status manager 402 may only log this power status data.

As mentioned above, and as further shown in FIG. 4, the streaming management system 106 can include the streaming manager 404. In one or more implementations, the streaming manager 404 can pause a digital content stream, generate and provide an option to restart the digital content stream, and restart the digital content stream. For example, the streaming manager 404 may pause the digital content stream in response to determinations and/or predictions made by the display device status manager 402. To illustrate, the streaming manager 404 may pause the digital content stream in response to the display device status manager 402 determining that the display device 112 is powered off. Additionally, the streaming manager 404 may generate and provide an option to restart the digital content stream in response to the display device status manager 402 determining that the display device 112 is powered back on. In some implementations, the streaming manager 404 can pause the digital content stream by bookmarking (e.g., recording) a current playback position and stopping transmission of the content stream to the display device 112. In response to a detected selection of the option to restart the digital content stream, the streaming manager 404 can determine the playback position where the user left off based on the bookmark and transmit the digital content stream according to the determined playback position.

In some implementations, the streaming manager 404 pauses or restarts the digital content stream by generating instructions for the digital content system 104 that cause the digital content system 104 to pause or restart the digital content stream. In other implementations, the streaming manager 404 may pause or restart the digital content stream by deactivating or activating a connection between the server(s) 102 and the digital content receiver 108.

Additionally, in one or more implementations, the streaming manager 404 can log additional information in response to pausing and restarting a digital content stream. For example, the streaming manager 404 can log the playback position of a digital content stream where playback was paused and/or restarted in a digital content stream. In at least one implementation, the streaming manager 404 can share, transmit, or otherwise make available the bookmarked playback positions to indicate viewership data to the digital content system 104 and/or other third-party system.

As shown in FIGS. 1 and 4, the server(s) 102 and the digital content receiver 108 can include one or more physical processors, such as the physical processor 120. The physical processor 120 generally represents any type or form of hardware-implemented processing unit capable of interpreting and/or executing computer-readable instructions. In one implementation, the physical processor 120 may access and/or modify one or more of the components of the streaming management system 106. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 102 and the digital content receiver 108 can include the memory 116. In one or more implementations, the memory 116 generally represents any type or form of volatile or non-volatile storage device or medium capable of storing data and/or computer-readable instructions. In one example, the memory 116 may store, load, and/or maintain one or more of the components of the streaming management system 106. Examples of the memory 116 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 102 and the digital content receiver 108 can include additional items 118. On the server(s) 102, the additional items 118 can include the digital streaming data 406. As mentioned above, the digital streaming data 406 can include a determination machine learning model, machine learning training data, tables and other repositories associated with determining whether a display device is powered on, and digital stream history data associated with subscribers to the digital content system 104.

In summary, the streaming management system 106 alleviates the waste and inaccuracy of previous systems by detecting when a digital content stream is going unwatched. As discussed above, the streaming management system 106 analyzes signals associated with display protocols and interfaces utilized by a display device to determine a power status of the display device. If the display device is powered off, the streaming management system 106 can pause a digital content stream being provided to the display device. By pausing the digital content stream in response to determining that it is going unwatched, the streaming management system 106 saves network bandwidth and increases the accuracy of metrics associated with the digital content stream.

EXAMPLE EMBODIMENTS

Example 1: A computer-implemented method for pausing a digital content stream in response to determining that the associated display device has been turned off. For example, the method may include detecting a status change corresponding to a display device associated with a content receiver for a digital content system, determining, based on the detected status change, that the display device is turned off, and pausing a digital content stream to the content receiver based on the determination.

Example 2: The computer-implemented method of Example 1, further including detecting an additional status change corresponding to the display device.

Example 3: The computer-implemented method of any of Examples 1 and 2, further including determining, based on the detected additional status change, that the display device is turned on.

Example 4: The computer-implemented method of any of Examples 1-3, further including providing an option to restart the digital content stream based on determining that the display device is turned on.

Example 5: The computer-implemented method of any of Examples 1-4, wherein detecting the status change corresponding to the display device comprises at least one of: detecting a change in HDMI status associated with the display device, detecting a change in HDCP version associated with the display device, or detecting a change in CEC status associated with the display device.

Example 6: The computer-implemented method of any of Examples 1-5, further including detecting a user-selected option to restart the digital content stream and restarting the digital content stream to the content receiver.

Example 7: The computer-implemented method of any of Examples 1-6, further including generating machine learning model training data based on restarting the digital content stream to the content receiver and applying a determination machine learning model to the generated machine learning model training data.

Example 8: The computer-implemented method of any of Examples 1-7, further including, in response to pausing the digital content stream to the digital content receiver, generating a bookmark indicating a current playback position of the paused digital content stream.

Example 9: The computer-implemented method of any of Examples 1-8, further including, transmitting the generated bookmark to one or more additional systems.

In some examples, a system may include at least one processor and a physical memory including computer-executable instructions that, when executed by the at least one processor, cause the at least one processor to perform various acts. For example, the computer-executable instructions may cause the at least one processor to perform acts including detecting a status change corresponding to a display device associated with a content receiver for a digital content system, determining, based on the detected status change, that the display device is turned off, and pausing a digital content stream to the content receiver based on the determination.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to detect a status change corresponding to a display device associated with a content receiver for a digital content system, determine, based on the detected status change, that the display device is turned off, and pause a digital content stream to the content receiver based on the determination.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

streaming, by a server, a digital content stream to a digital content receiver via a network;

detecting, by the server, a status change of an interface of a display protocol implemented by a display device associated with the digital content receiver for a digital content system by:

receiving a plurality of signals transmitted via display protocol utilized by the display device; and detecting the status change of the interface of the display protocol implemented by the display device based at least in part on the plurality of signals transmitted via the display protocol;

determining, by the server, that the display device is turned off based on the detected status change of the interface of the display protocol; and pausing, by the server, the digital content stream to the digital content receiver in response to determining that the display device is turned off.

2. The computer-implemented method of claim 1, further comprising detecting an additional status change of the display device.

3. The computer-implemented method of claim 2, further comprising determining, based on the detected additional status change, that the display device is turned on.

4. The computer-implemented method of claim 3, further comprising providing an option to restart the digital content stream based on determining that the display device is turned on.

5. The computer-implemented method of claim 1, wherein detecting the status change of the display device comprises at least one of: detecting a change in high-definition multimedia interface (HDMI) status associated with the display device, detecting a change in high-bandwidth digital content protection (HDCP) version associated with the display device, or detecting a change in consumer electronics control (CEC) status associated with the display device.

6. The computer-implemented method of claim 1, further comprising: detecting a user-selected option to restart the digital content stream; and restarting the digital content stream to the digital content receiver.

7. The computer-implemented method of claim 6, further comprising:

generating machine learning model training data based on restarting the digital content stream to the digital content receiver; and applying a determination machine learning model to the generated machine learning model training data.

8. The computer-implemented method of claim 1, further comprising, in response to pausing the digital content stream to the digital content receiver, generating a bookmark indicating a current playback position of the paused digital content stream.

9. The computer-implemented method of claim 8, further comprising transmitting the generated bookmark to one or more additional systems.

10. The computer-implemented method of claim 1, wherein detecting the status change of the display device comprises:

receiving, from the digital content receiver, a first signal included in the plurality of signals; and detecting the status change of the display device based at least in part on the first signal.

11. The computer-implemented method of claim 10, wherein detecting the status change of the display device comprises:

after having received the first signal, receiving, from the digital content receiver, an additional signal included in the plurality of signals;

determining that the first signal and the additional signal are different from one another; and detecting the status change of the display device based at least in part on the first signal and the additional signal being different from one another, wherein the display protocol comprises at least one of:

high-definition multimedia interface (HDMI);

high-bandwidth digital content protection (HDCP); or consumer electronics control (CEC).

12. The computer-implemented method of claim 11, wherein:

determining that the display device is turned off comprises inferring, by the server, a power state of the display device based at least in part on the first signal and the additional signal being different from one another; and pausing the digital content stream comprises pausing the digital content stream based at least in part on the power state of the display device.

13. The computer-implemented method of claim 1, wherein detecting the status change of the interface implemented by the display device comprises detecting a status change of a high-definition multimedia interface (HDMI) implemented by the display device.

14. A system comprising:

at least one physical processor incorporated in a server; and physical memory that is incorporated in the server and comprises computer-executable instructions that, when executed by the at least one physical processor, cause the server to perform acts comprising:

streaming a digital content stream to a digital content receiver via a network;

detecting a status change of an interface of a display protocol implemented by a display device associated with the digital content receiver for a digital content system by:

receiving a plurality of signals transmitted via a display protocol utilized by the display device; and detecting the status change of the interface of the display protocol implemented by the display device based at least in part on the plurality of signals transmitted via the display protocol;

determining, based on the detected status change of the interface of the display protocol, that the display device is turned off; and pausing the digital content stream to the digital content receiver in response to determining that the display device is turned off.

15. The system of claim 14, further comprising detecting an additional status change of the display device.

16. The system of claim 15, further comprising determining, based on the detected additional status change, that the display device is turned on.

17. The system of claim 16, further comprising providing an option to restart the digital content stream based on determining that the display device is turned on.

18. The system of claim 14, wherein detecting the status change of the display device comprises at least one of: detecting a change in HDMI status associated with the display device, detecting a change in HDCP version associated with the display device, or detecting a change in CEC status associated with the display device.

19. A non-transitory computer-readable medium comprising one or more computer-executable instructions that, when executed by at least one processor of a server, cause the server to:

stream a digital content stream to a digital content receiver via a network;

detect a status change of an interface of a display protocol implemented by a display device associated with the digital content receiver for a digital content system by:

receiving a plurality of signals transmitted via a display protocol utilized by the display device; and detecting the status change of the interface of the display protocol implemented by the display device based at least in part on the plurality of signals transmitted via the display protocol;

determine, based on the detected status change of the interface of the display protocol, that the display device is turned off; and pause the digital content stream to the digital content receiver in response to determining that the display device is turned off.

* * * * *